US 010255434B2

(12) United States Patent
Gathala et al.

(10) Patent No.: US 10,255,434 B2
(45) Date of Patent: Apr. 9, 2019

(54) DETECTING SOFTWARE ATTACKS ON PROCESSES IN COMPUTING DEVICES

(71) Applicant: QUALCOMM Incorporated, San Diego, CA (US)

(72) Inventors: Sudha Anil Kumar Gathala, Tracy, CA (US); Rajarshi Gupta, Sunnyvale, CA (US); Nayeem Islam, Palo Alto, CA (US)

(73) Assignee: QUALCOMM Incorporated, San Diego, CA (US)

(*) Notice: Subject to any disclaimer, the term of this patent is extended or adjusted under 35 U.S.C. 154(b) by 209 days.

(21) Appl. No.: 15/057,336

(22) Filed: Mar. 1, 2016

(65) Prior Publication Data
US 2017/0083702 A1     Mar. 23, 2017

Related U.S. Application Data

(60) Provisional application No. 62/219,970, filed on Sep. 17, 2015.

(51) Int. Cl.
*G06F 21/52* (2013.01)
*G06F 21/55* (2013.01)
*G06F 21/56* (2013.01)

(52) U.S. Cl.
CPC ............ *G06F 21/554* (2013.01); *G06F 21/52* (2013.01); *G06F 21/552* (2013.01); *G06F 21/566* (2013.01)

(58) Field of Classification Search
None
See application file for complete search history.

(56) References Cited

U.S. PATENT DOCUMENTS

| | | | |
|---|---|---|---|
| 7,996,904 B1 | 8/2011 | Chiueh et al. | |
| 8,584,254 B2 | 11/2013 | Cui et al. | |
| 8,656,497 B2 | 2/2014 | Amarasinghe et al. | |
| 8,955,104 B2 | 2/2015 | Arbaugh et al. | |
| 9,401,922 B1 * | 7/2016 | Walters | H04L 63/14 |
| 9,866,426 B2 * | 1/2018 | Shelton | H04L 41/0604 |
| 2010/0064367 A1 | 3/2010 | Lysemose | |
| 2011/0082962 A1 | 4/2011 | Horovitz et al. | |
| 2011/0179490 A1 | 7/2011 | Jin et al. | |
| 2012/0284221 A1 * | 11/2012 | Shelton | H04L 41/0604 706/47 |

(Continued)

OTHER PUBLICATIONS

International Search Report and Written Opinion—PCT/US2016/046747—ISA/EPO—dated Oct. 21, 2016.

(Continued)

*Primary Examiner* — Madhuri R Herzog
(74) *Attorney, Agent, or Firm* — The Marbury Law Group, PLLC

(57) ABSTRACT

Various embodiments include methods for detecting software attacks on a process executing on a computing device. Various embodiment methods may include monitoring structural attributes of a plurality of virtual memory regions utilized by the process, and comparing the monitored structural attributes to the expected structural attributes of the plurality of VMRs. Various embodiment methods may further include determining whether the monitored structural attributes represent anomalous behavior of the process based on the comparison between the monitored structural attributes and the expected structural attributes.

28 Claims, 12 Drawing Sheets

(56) References Cited

U.S. PATENT DOCUMENTS

2015/0215335 A1\* 7/2015 Giuliani .............. H04L 63/1441
  726/23
2016/0004861 A1\* 1/2016 Momot ................. G06F 21/552
  726/23
2017/0032118 A1\* 2/2017 Carson ................... G06F 21/52

OTHER PUBLICATIONS

Ligh M.H, "Locating Hidden Clampi Dlls (VAD-style)," Feb. 11, 2008 (Feb. 11, 2008), XP055210493, Retrieved from the Internet:URL:http://mnin.blogspot.de/2008/11/locating-hidden-clampi-dlls-vad-style.html [retrieved on Sep. 1, 2015], 4 pages.

Zhao, "A Program Logic and Its Application in Fully Verified Software Fault Isolation", A dissertation submitted to the faculty, School of Computing, The University of Utah, Aug. 2012.

\* cited by examiner

DETECTING SOFTWARE ATTACKS ON PROCESSES IN COMPUTING DEVICES

RELATED APPLICATIONS

This application claims the benefit of priority to U.S. Provisional Application No. 62/219,970 entitled "Detecting Software Attacks on Processes in Computing Devices" filed Sep. 17, 2015, the entire contents of which are hereby incorporated by reference.

BACKGROUND

Various computing devices, including desktop computers, laptops, tablets, and mobile communication devices such as smart phones, execute applications and system processes according to software instructions stored in memory. Certain application processes or system service processes may have higher access permissions on the computing device (e.g. root access permission). These processes may be targeted by control-hijacking software, which aims to take control of a privileged process and execute malicious code. The goal of the control-hijacking software may try to obtain a shell or steal private data.

There are a number of different types of control-hijacking software attacks. For example, "stack smashing" may involve creating a stack buffer overflow and executing malicious code inserted into the stack. A heap buffer overflow works similarly to overflow the heap and cause execution of malicious code inserted in another location in memory. A return-oriented-programming or attack generates a stack overflow, followed by execution of selected portions of existing code that when connected together achieve a malicious purpose.

SUMMARY

Various embodiments include methods implemented on a computing device for detecting software attacks on a process executing on the computing device. Various embodiments may include monitoring structural attributes of a plurality of virtual memory regions utilized by the process, comparing the monitored structural attributes to expected structural attributes of the plurality of virtual memory regions, and determining whether the monitored structural attributes represent anomalous behavior of the process based on the comparison between the monitored structural attributes and the expected structural attributes.

Some embodiments may further include initiating a protective action in response to determining that the monitored structural attributes represent anomalous behavior. In some embodiments, the monitored structural attributes of the plurality of virtual memory regions may include a number of virtual memory regions utilized by the process, a size of each of the plurality of virtual memory regions, address space layout changes of the plurality of virtual memory regions, access permission changes of the plurality of virtual memory regions, and/or a state transition history of the plurality of virtual memory regions.

In some embodiments, monitoring structural attributes of the plurality of virtual memory regions utilized by the process may include storing information about a current virtual memory region in which the process is executing, receiving new information about an instruction currently being executed by the process, determining whether there has been a transition from the current virtual memory region based on the new information, and logging the transition from the current virtual memory region to a new virtual memory region upon determining that there has been a transition from the current virtual memory region. In some embodiments, the new information may include a program counter and a process identifier.

In some embodiments, monitoring structural attributes of the plurality of virtual memory regions utilized by the process may include storing information about a current virtual memory region in which the process is executing, implementing one or more virtual memory region tracking strategies on the plurality of virtual memory regions, determining whether there has been a transition from the current virtual memory region from the one or more virtual memory region tracking strategies, and logging the transition from the current virtual memory region to a new virtual memory region upon determining that there has been a transition from the current virtual memory region. In some embodiments, the one or more virtual memory region tracking strategies may include selective tracking, periodic tracking, opportunistic tracking, and page fault based tracking.

In some embodiments, comparing the monitored structural attributes to expected structural attributes of the plurality of virtual memory regions may include applying a set of rules to the monitored structural attributes, in which the set of rules are based on the expected structural attributes of the plurality of virtual memory regions. In some embodiments, comparing the monitored structural attributes to expected structural attributes of the plurality of virtual memory regions may include modeling the expected structural attributes of the plurality of virtual memory regions and comparing the monitored structural attributes to the model.

Further embodiments include a computing device including a memory and a processor configured with processor-executable instructions to perform operations of the methods summarized above. Further embodiments include a non-transitory processor-readable storage medium having stored thereon processor-executable software instructions configured to cause a processor of a computing device to perform operations of the methods summarized above. Further embodiments include a computing device that includes means for performing functions of the operations of the methods summarized above.

BRIEF DESCRIPTION OF THE DRAWINGS

The accompanying drawings, which are incorporated herein and constitute part of this specification, illustrate example embodiments, and together with the general description and the detailed description given herein, serve to explain the features of the claims.

DETAILED DESCRIPTION

Figure 1A:
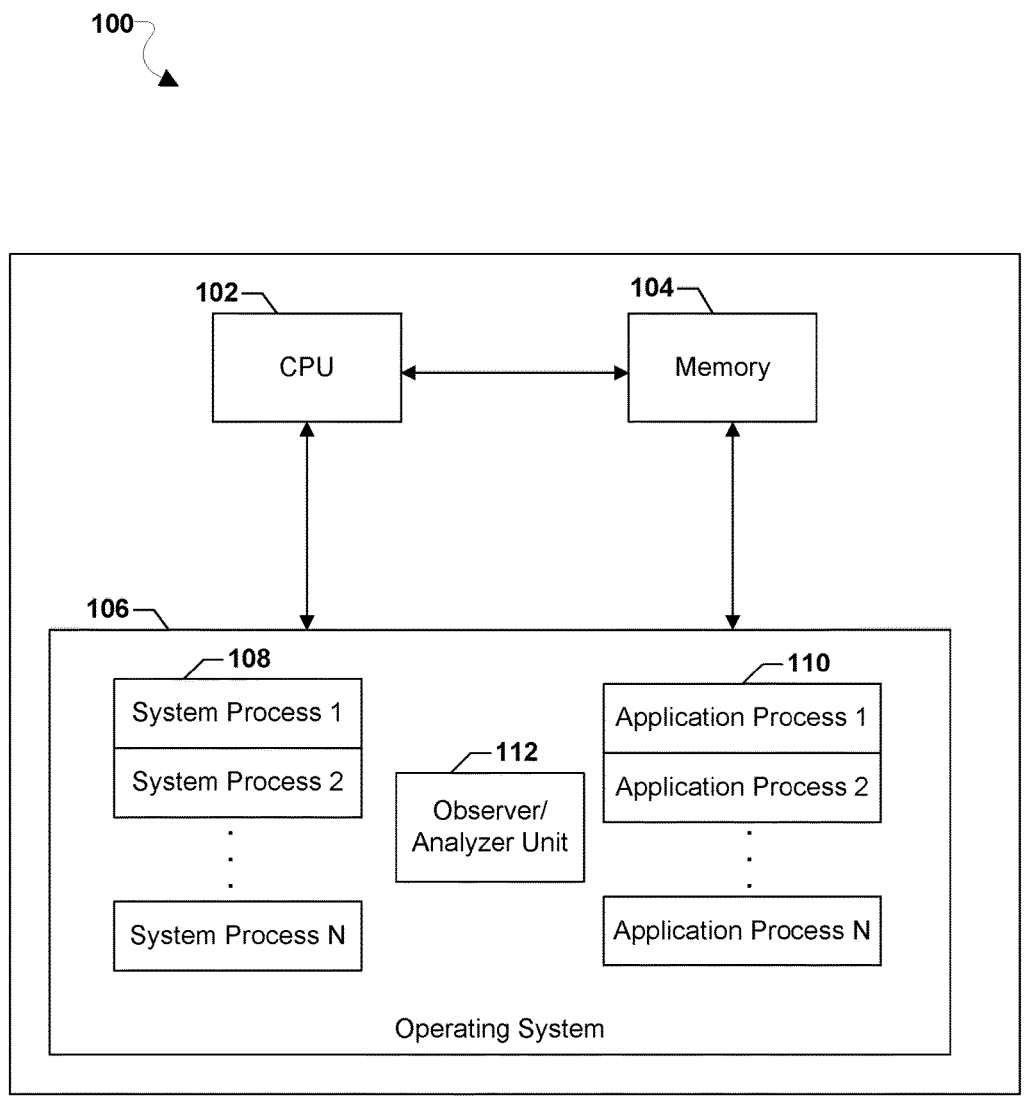
FIG. 1A is a block diagram of a computing device for use in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the term "computing device" refers to any one or all of cellular telephones, smart phones, personal or mobile multi-media players, personal data assistants, desktop computers, laptop computers, tablet computers, servers, smart books, smart watches, palm-top computers, wireless electronic mail receivers, multimedia Internet-enabled cellular telephones, wireless gaming controllers, and similar personal or enterprise electronic devices that includes a programmable processor and memory.

Computing devices execute various application and system processes, some of which may have privileged access to low levels of the computing device, such as root access. These processes may be subject to control-hijacking software attacks that attempt to take control of the computing device at a low level. Examples of these attacks may include stack or heap buffer overflow attacks and return-on-programming attacks.

Each process has a certain internal memory structure, or a geography of its internal state that is maintained by the operating system. For example, each process has a process address space that lays out where the various instructions and data for that process are stored in memory. Processes typically load the same set of libraries, and library dependencies do not usually dynamically change during run time. Also, processes generally execute code and traverse its address space in a predictable manner. This may be particularly true for system services which are designed to handle a similar set of requests repeatedly.

When a control-hijacking software attack occurs, the targeted process' internal memory structure and behavior in traversing the address space may change. For example, the malicious software may cause a change in the control flow of a process (i.e. a different set of instructions are executed, or executed in a different order). Regions of memory from where the code is executing may be different.

In overview, various embodiments provide systems and methods for monitoring the internal state of the memory structure, or geography, of a process to detect anomalous execution behavior caused by control-hijacking software attacks. A process address space of a process may be divided into a number of virtual memory regions (VMRs) which represent contiguous portions of memory within the process address space that store data, functions, or instructions. An observer or analyzer unit in a computing device may monitor various structural attributes of the VMRs for a process executing on the computing device. The structural attributes monitored may include the number of VMRs utilized by the process, the size of each VMR, address space layout changes of the VMRs, access permission changes of the VMRs, and VMR state transition history. Structural attributes may be independent of the data stored within each VMR.

The monitored structural attributes of the VMRs of the process may then be compared to the expected structural attributes of the VMRs of the process. If the monitored structural attributes deviate from the expected structural attributes, it may be an indication that the process has been hijacked for a malicious purpose. The computing device may then take certain protective actions in response, for example by terminating the process, initiating anti-malware programs, or locking certain portions of the operating system from the process.

FIG. 1A is a functional block diagram of a computing device 100 suitable for implementing various embodiments. The computing device 100 may be, among other things, a desktop computer, laptop, tablet, any type of mobile electronic device, a server or any type of consumer or enterprise electronic device. The computing device 100 may include a central processing unit (CPU) 102 for executing software instructions, and a memory 104 for storing code and data. The memory 104 may be a non-transitory computer-readable storage medium that stores processor-executable instructions. The memory 104 may store an operating system 106. A number of system processes 108 and/or application processes 110 may be executing on the computing device 100 within the operating system 106. Some of the processes 108, 110 may belong to certain privileged applications or system services that have higher access permissions to low levels of the computing device 100 (e.g. root or basic input/output system (BIOS) access).

The computing device 100 may also include an observer/analyzer unit 112 that executes within the operating system 106 to monitor attributes of VMRs of the processes 108, 110. The observer/analyzer unit 112 may collect and monitor the structural attributes of the VMRs and compare the monitored structural attributes to expected structural attributes of the VMRs of the processes 108, 110. The observer/analyzer unit 112 may utilize one or more techniques for monitoring and comparing the structural attributes, including modeling, machine learning, and rules-based analysis. The observer/analyzer unit 112 may produce an output indicating when one or more of the processes 108, 110 are exhibiting anomalous behavior.

The computing device 100 may also include various other components not illustrated in FIG. 1A. For example, the computing device 100 may include a number of input, output, and processing components such as a speaker, microphone, modem, transceiver, subscriber identification module (SIM) card, keypad, mouse, display screen or touchscreen, various connection ports, audio or graphics processor, additional hard drives, and many other components known in the art.

Figure 1B:
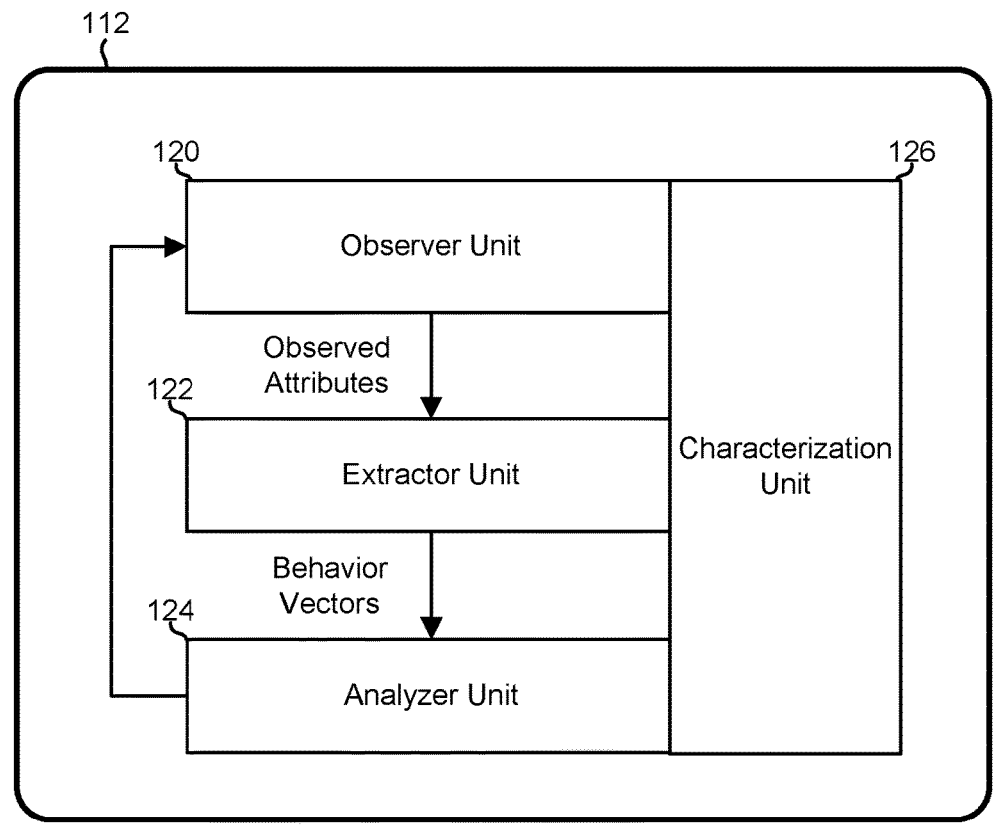
FIG. 1B is a functional block diagram of an observer/analysis unit for analyzing structural attributes of a virtual memory region in accordance with various embodiments.

FIG. 1B illustrates example logical components and information flows for the observer/analyzer unit 112 of FIG. 1A. The observer/analyzer unit 112 may execute within a processor, such as the CPU 102, and may be configured to use behavioral analysis techniques to characterize the expected and observed structural attributes of VMRs of a process. The observer/analyzer unit 112 may include an observer unit 120, an extractor unit 122, an analyzer unit 124, and a characterization unit 126.

In various implementations, all or portions of the observer/analyzer unit 112 may be implemented as part of the observer unit 120, an extractor unit 122, an analyzer unit 124, and a characterization unit 126. Each of the units 120-126 may be a thread, process, daemon, sub-system, or component that is implemented in software, hardware, or a combination thereof. In various implementations, the units 120-126 may be implemented within parts of the operating system (e.g., within the kernel, in the kernel space, in the user space, etc.), within separate programs or applications, in specialized hardware buffers or processors, or any combination thereof. In some implementations, one or more of the units 120-126 may be implemented as software instructions executing on one or more processors the computing device 100.

The characterization unit 126 may be configured to characterize the behavior of a process and the expected structural attributes of VMRs utilized by the process. The characterization unit 126 may use the characterized behavior and expected structural attributes to generate at least one model based on an observed process' behavior. The characterization unit 126 may compare the observed behavior with a behavior model. The characterization unit 126 may also aggregate the comparisons made by other units of the behavior of the observed process and respective behavior models. The characterization unit 126 may determine, based on the aggregated comparisons, whether the observed process is behaving anomalously. The characterization unit 126 may use the information collected by the observer unit 120 to determine the structural attributes of VMRs utilized by the observed process, and to use any or all such information to characterize the behavior of the observed process.

The observer unit 120 may be configured to observe/monitor behaviors of a process and to determine the structural attributes of the VMR based on the observation/monitoring. The structural attributes may include the number of VMRs utilized by the process, the size of each VMR, address space layout changes of the VMRs, access permission changes of the VMRs, and VMR state transition history.

The observer unit 120 may communicate (e.g., via a memory write operation, function call, etc.) the collected observed behavior data, including observed structural attributes, to the extractor unit 122. The extractor unit 122 may be configured to receive or retrieve the observed behavior data from a log file and use this information to generate one or more behavior vectors based on the observed structural attributes. Each behavior vector may succinctly describe the observed structural attributes in a value or vector data-structure. In some implementations, the vector data-structure may include a series of numbers, each of which signifies a partial or complete representation of the real-time data collected by the observer unit 120.

In some implementations, the extractor unit 122 may be configured to generate the behavior vectors from a log file generated by the observer unit 120. The behavior vectors may function as an identifier that enables the behavioral analysis system (e.g., the analyzer unit 124) to quickly recognize, identify, or analyze real-time process behavior and VMR structural attributes. In some implementations, the extractor unit 122 may be configured to generate behavior vectors of size "n," each of which maps the real-time process behavior and VMR structural attributes into an n-dimensional space. In an example implementation, the extractor unit 122 may be configured to generate the behavior vectors to include information that may be input to a feature/decision node in the characterization unit 126 to generate an answer to a query regarding one or more features of the process' VMR structural attributes to characterize the behavior of the process.

The extractor unit 122 may communicate (e.g., via a memory write operation, function call, etc.) the generated behavior vector(s) to the analyzer unit 124. The analyzer unit 124 may be configured to apply the behavior vector(s) to a classifier model to characterize the observed behaviors of the process, such as whether the monitored structural attributes of VMRs utilized by the process indicate that the process is legitimate, non-legitimate, or anomalous.

A classifier model may be a behavior model that includes data and/or information structures (e.g., feature vectors, behavior vectors, component lists, etc.) that may be used to evaluate a specific feature or aspect of process activities. The classifier model may also include decision criteria for monitoring a number of VMRs utilized by a process. The classifier model may be preinstalled on the computing device 100, downloaded or received from a network server, generated in the observer unit 120, or any combination thereof. The classifier model may be generated by using behavior modeling techniques, machine learning algorithms, or other methods of generating classifier models.

In some implementations, the classifier model may be specific to certain types of processes (e.g., application processes versus system processes). Such a classifier model may include a focused data model that includes/tests only process-specific features/entries that are determined to be most relevant to evaluating the behavior of a particular process.

In some implementations, the analyzer unit 124 may be configured to adjust the granularity or level of detail of the features of the process that the analyzer unit 124 evaluates, in particular when the analysis of process behavior is inconclusive. For example, the analyzer unit 124 may be configured to notify the observer unit 120 in response to determining that it cannot characterize a behavior of a process. In response, the observer unit 120 may change the VMR structural attributes that are monitored and/or adjust the granularity of its observations (i.e., the level of detail and/or the frequency at which observed behavior is observed) based on a notification sent from the analyzer unit 124 (e.g., a notification based on results of the analysis of the observed behavior features).

The observer unit 120 may also observe new or additional VMR structural attributes, and send the new/additional observed behavior data to the extractor unit 122 and the analyzer unit 124 for further analysis/classification. Such feedback communications between the observer unit 120 and the analyzer unit 124 may enable the observer/analyzer unit 112 to recursively increase the granularity of the observations (i.e., make more detailed and/or more frequent observations) or change the real-time data that are observed. The observer/analyzer unit 112 may increase the granularity of observations or change the real-time data that are observed until the analyzer unit 124 can evaluate and characterize behavior of a process to within a range of reliability or up to a threshold level of reliability. Such feedback communications may also enable the observer/analyzer unit 112 to adjust or modify the behavior vectors and classifier models without consuming an excessive amount of processing, memory, or energy resources.

In various implementations, the classifier model may be a set of boosted decision stumps based on specific features of process behavior. Boosted decision stumps are one-level decision trees that may have exactly one node (i.e., one test question or test condition) and a weight value, and may be suited for use in a light, non-processor intensive binary classification of data/behaviors. Applying a behavior vector to boosted decision stump may result in a binary answer (e.g., 1 or 0, yes or no, etc.). For example, a question/condition tested by a boosted decision stump may include whether a word or sound detected by a device microphone is characteristic of an RF-sensitive environment, or whether an image of another device captured by a device camera is recognizable as an RF emissions generating hazard, the answers to which may be binary. Boosted decision stumps are efficient because such models do not require significant processing resources to generate the binary answer. Boosted decision stumps may also be highly parallelizable, enabling many stumps to be applied or tested in parallel/at the same time (e.g., by multiple cores or processors in a unit, computing device, or system).

Figure 2:
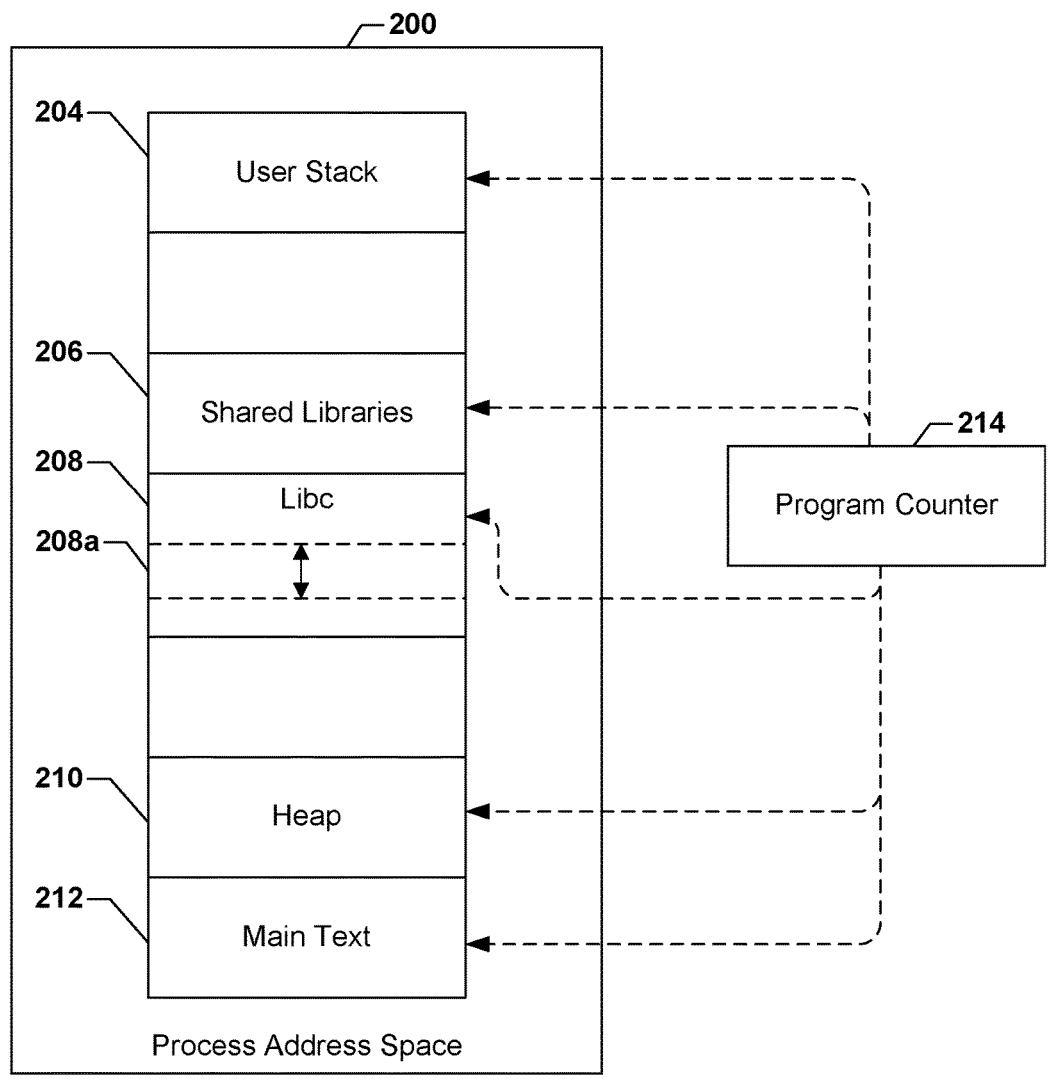
FIG. 2 is a diagram of a process address space in accordance with various embodiments.

FIG. 2 illustrates an example of a process address space 200 of a process (e.g. one of the processes 108, 110) that may be executing on the computing device 100. Operating systems on a computing device typically establish separate address spaces for each active process executing on the computing device. The process address space 200 may include several address ranges, or virtual memory areas (VMAs). Each VMA may be used to map and load a given portion of the process into memory. Depending on how much code is loaded by a process, how much the stack and heaps are used, and how many libraries are loaded, the process address space 200 may be sparse or dense.

The process address space 200 may contain a VMA for a user stack 204. The user stack 204 is a region of memory that is used to store temporary variables created by the process. The user stack 204 may be constructed as first in, last out (FILO) data structure in which variables are stored in the stack from the bottom up, and are popped from the stack top first. The process address space 200 may also include VMAs for a libc library 208 and other shared libraries 206. The libraries 206, 208 may contain a number of shared functions that a number of processes utilize. Each process may load a copy of the libraries 206, 208 into its address space. The process address space 200 may also include a VMA for a heap 210, which may be used to store global variables and other information. Information may be added and removed from the heap 210 using, for example, the malloc( ) and free( ) functions. The process address space 200 may also include a VMA for a main text 212, which may include the main body of code for the process.

A VMA may be sub-divided into multiple virtual memory regions (VMRs), in which each VMR may be a contiguous range of addresses within a VMA that store data, instructions, or functions. For example, the VMA for the libc library 208 may contain a VMR 208a, which for example may encompass a specific function in the libc library 208.

The CPU of the computing device may utilize a program counter (PC) 214 that contains the address of the instruction currently being executed by the process. The PC 214 may jump around the process address space 200 as different parts of the address space are called. For example, the PC 214 may start in the main text 212 and move to the libc library 208 when a function is called. The PC 214 may then move to the stack 204 to read or write a temporary variable used within the function, and then move back to the main text 212.

The process address space 200 may be subject to several different types of control-hijacking software attacks, which are illustrated in FIGS. 3A-5. One type of attack is a stack buffer overflow attack, or "stack smashing" attack. An example code for illustrating a stack buffer overflow attack is shown herein:

```
void foo(char *str) {
    char buf[128];
    strcopy(buf, str);
    printf("input string stored on stack\n");
}
```

Figure 3A:
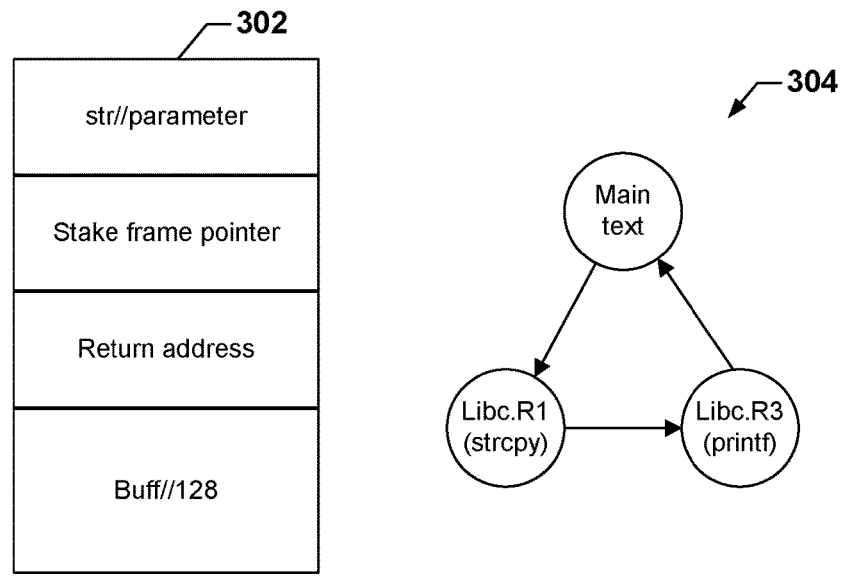
FIGS. 3A-3B are diagrams illustrating a stack buffer overflow control-hijacking software attack.

FIG. 3A illustrates the contents of a stack 302 may be loaded when the foo function is called. The stack 302 may include memory allocated for the variable buf[128], then a return address for the function, a stack frame pointer, and the input str parameter. Flow diagram 304 shows the normal behavior of the process when the foo function is called from the main text of the process using the stack 302. The process may start in the main text and then move to a VMR of the libc library (libc.R1) to call the strcpy function, move to another VMR of the libc library (libc.R3) to call the printf function, and then move back to the main text of the process.

Figure 3B:
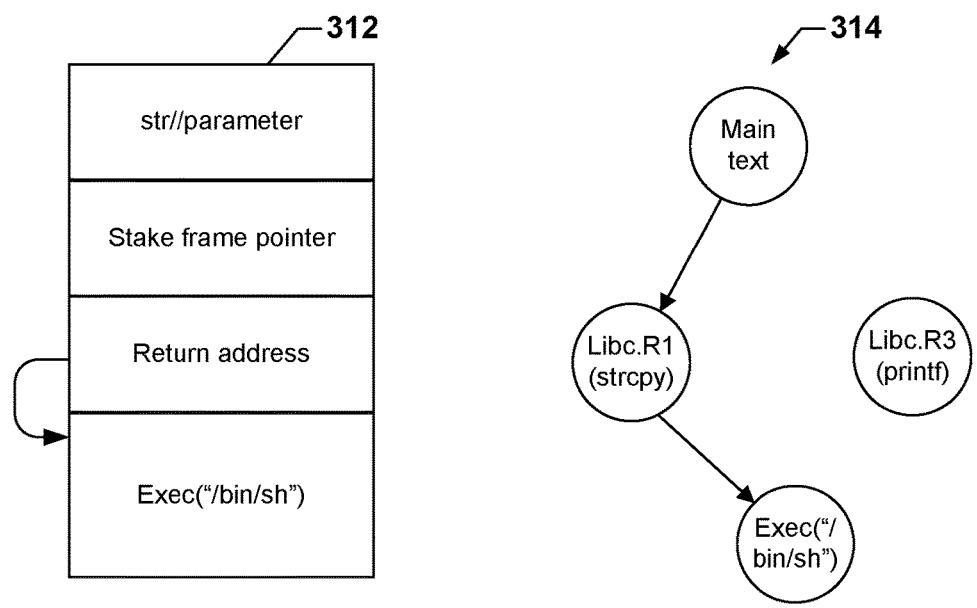

In a stack buffer overflow attack, the attacker's goal is to overflow a buffer on the stack, inject certain code onto the stack, and modify the return address on the stack to jump to the injected code. FIG. 3B illustrates a stack 312 that has been compromised by malicious software. The malicious software may call the foo function with a string variable that is larger than the allocated variable buf[128], causing a buffer overflow that overwrites other portions, or VMRs, of the stack 312. The input variable may contain the injected code (i.e., Exec("/bin/sh")) and a return address that points to the injected code. Thus, when the program counter reaches the return address in the stack 312, it jumps to the injected code and executes it.

Flow diagram 314 shows the anomalous behavior of the process when the foo function is called from the main text of the process using the stack 312. The process may start in the main text and then move to a VMR of the libc library (libc.R1) to call the strcpy function. However, the return address for the strcpy function has been overwritten by the buffer overflow and now points to the injected code (Exec ("/bin/sh")) in the stack 312. The program counter will jump to the injected code and execute it.

Another type of control-hijacking attack is a heap buffer overflow attack. An example code for illustrating a heap buffer overflow attack is shown herein:

```
struct compare {
    char buf[128];
    voice (func*) (void);
}
void do_compare (struct compare *comp, char *one, char *two) {
    strcpy(comp->buf, one);
    strcat(comp->buf, two);
    return comp->func(comp->buf, "/data/secretstore/");
}
```

Figure 4A:
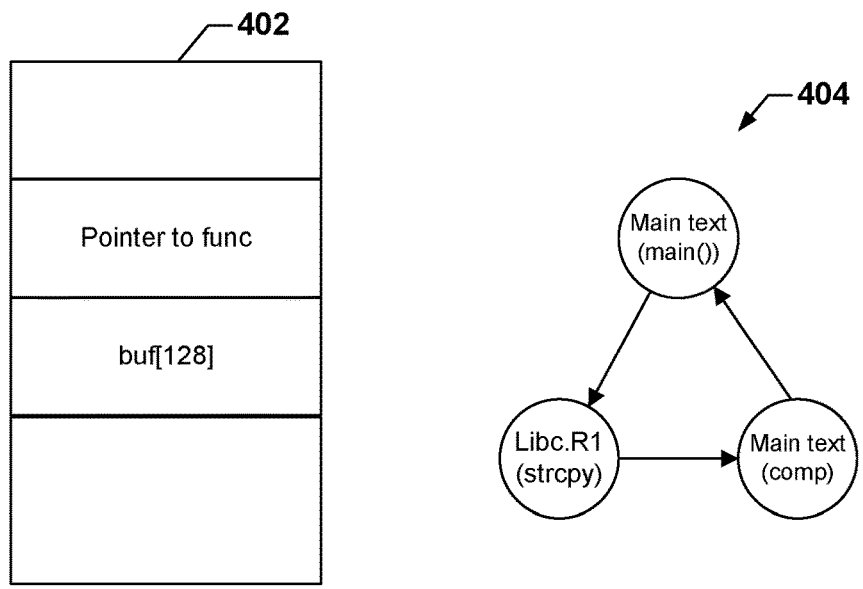
FIGS. 4A-4B are diagrams illustrating a heap buffer overflow control-hijacking software attack.

FIG. 4A illustrates the contents of a heap 402 may be loaded when the do_compare function is called. The heap 402 may include memory allocated for the variable buf [128], and then a pointer to a function. Flow diagram 404 shows the normal behavior of the process when the do_compare function is called from the main text of the process using the heap 402. The process may start in the main text and then move to a VMR of the libc library (libc.R1) to call the strcpy function, and then move back to another VMR of the main text to perform the rest of the function.

Figure 4B:
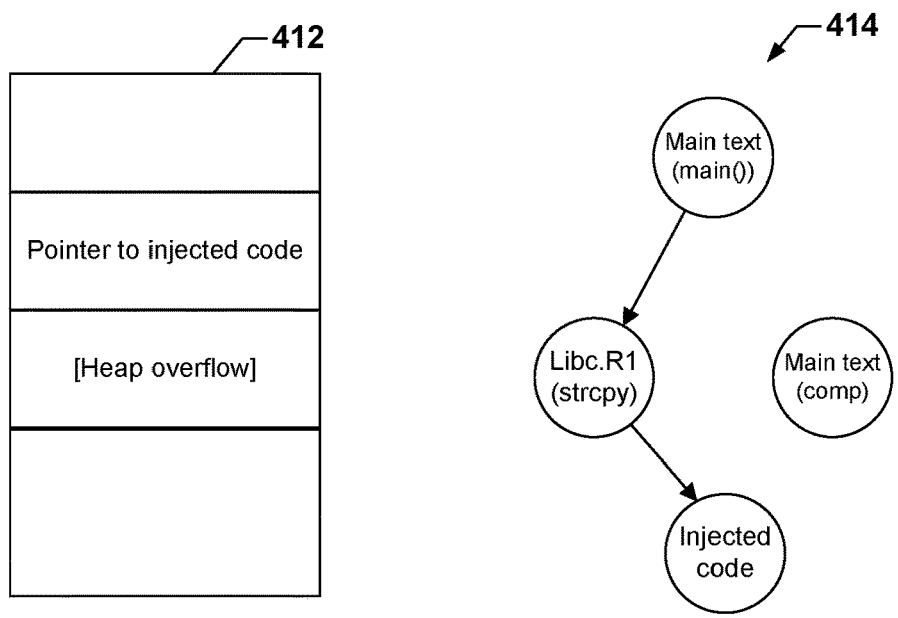

In a heap buffer overflow attack, the attacker's goal is to overflow an allocated buffer on the heap, inject certain code in another portion of memory, and overwrite the function pointer to redirect the function call to the injected code. FIG. 4B illustrates a heap 412 that has been compromised by malicious software. The malicious software may call the do_compare function with char variables that are larger than the allocated buffer, causing a buffer overflow that overwrites the function pointer stored in the heap 412 with another function pointer to injected code. Thus, when the program counter reaches the function pointer in the heap 412, it jumps to the injected code and executes it.

Flow diagram 414 shows the anomalous behavior of the process when the do_compare function is called from the main text of the process using the heap 412. The process may start in the main text and then move to a VMR of the libc library (libc.R1) to call the strcpy function. However, the function pointer stored in the heap 412 now points to the injected code rather than back to the main text. The program counter will jump to the injected code and execute it.

Another type of control-hijacking attack is a return-on-programming attack, which strings together small pieces of pre-existing code in the computing device to perform malicious functions. The small pieces of pre-existing code may be termed return-on-programming (ROP) gadgets. The ROP gadgets are tiny code sequences that end in a return instruction, and may be located in shared libraries or the main text of a process address space loaded by a process. The ROP gadgets may be called in a particular sequential order to acquire a shell or accomplish other malicious tasks.

Figure 5:
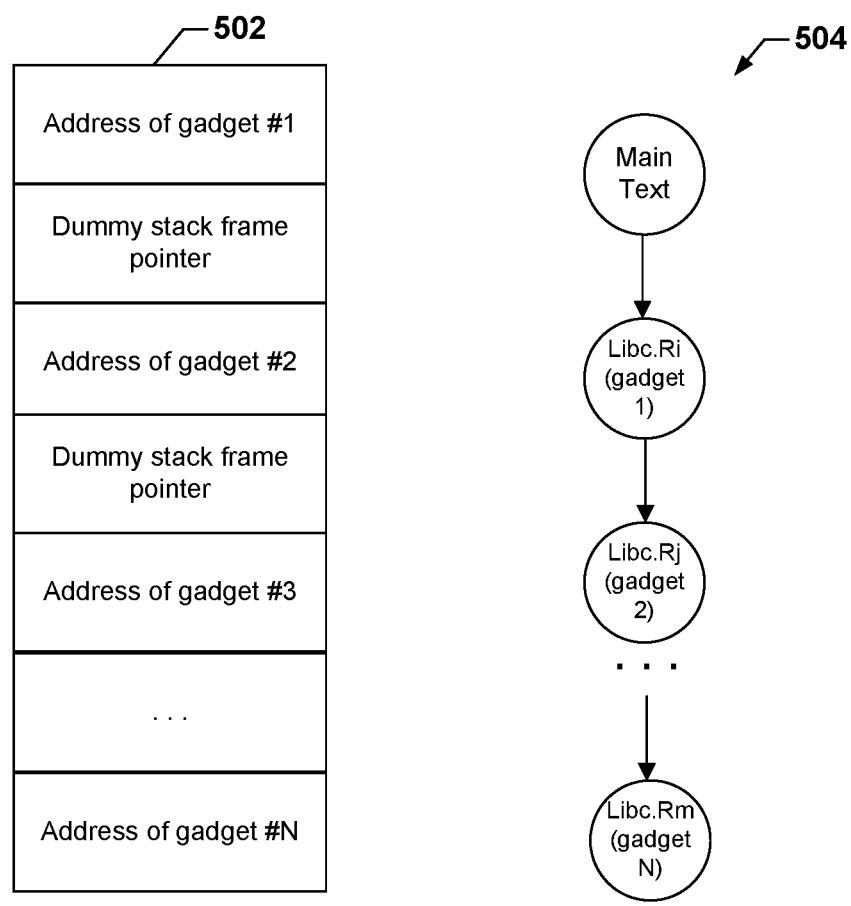
FIG. 5 is a diagram illustrating a return-on-programming control-hijacking software attack.

FIG. 5 illustrates a stack 502 that has been compromised to sequentially call a number of ROP gadgets. The stack 502 may be compromised via a buffer overflow similar to that described with reference to FIG. 3B. In this case, the stack 502 is overwritten to include addresses to a number of ROP gadgets, along with dummy stack frame pointers, in a specific order. Flow diagram 504 shows the anomalous behavior of the process when executing from the stack 502. The process may start in the main text and then move to the address stored in the stack 502. However, the top address in the stack 502 now points to ROP gadget 1, which may be located in a VMR in the libc library (e.g. libc.Ri). After executing ROP gadget 1, the program counter returns to the stack 502 and then moves to ROP gadget 2, which may be located in another VMR in the libc library (e.g. libc.Rk). The computing device may execute each ROP gadget in the order they are arranged in the stack 502.

Other types of control-hijacking attack may include integer overflow based attacks, which may work similarly to a stack or heap buffer overflow attack. A buffer allocation for an integer variable in a function may be allocated to be smaller than the variable, which causes an overflow. A function pointer may be inserted into the overflow, which points to injected malicious code.

All these types of control-hijacking software attacks generally change the way processes allocate and traverse the process address space, for example by altering the stack, the heap, or pointers to various parts of the address space. Processes may normally have fairly predictable routines, and so may have predictable behaviors for allocating or traversing the process address space. Thus, the address space for a process may be monitored and compared to expected behavior and anomalous behavior indicative of control-hijacking attacks may be detected.

Figure 6:
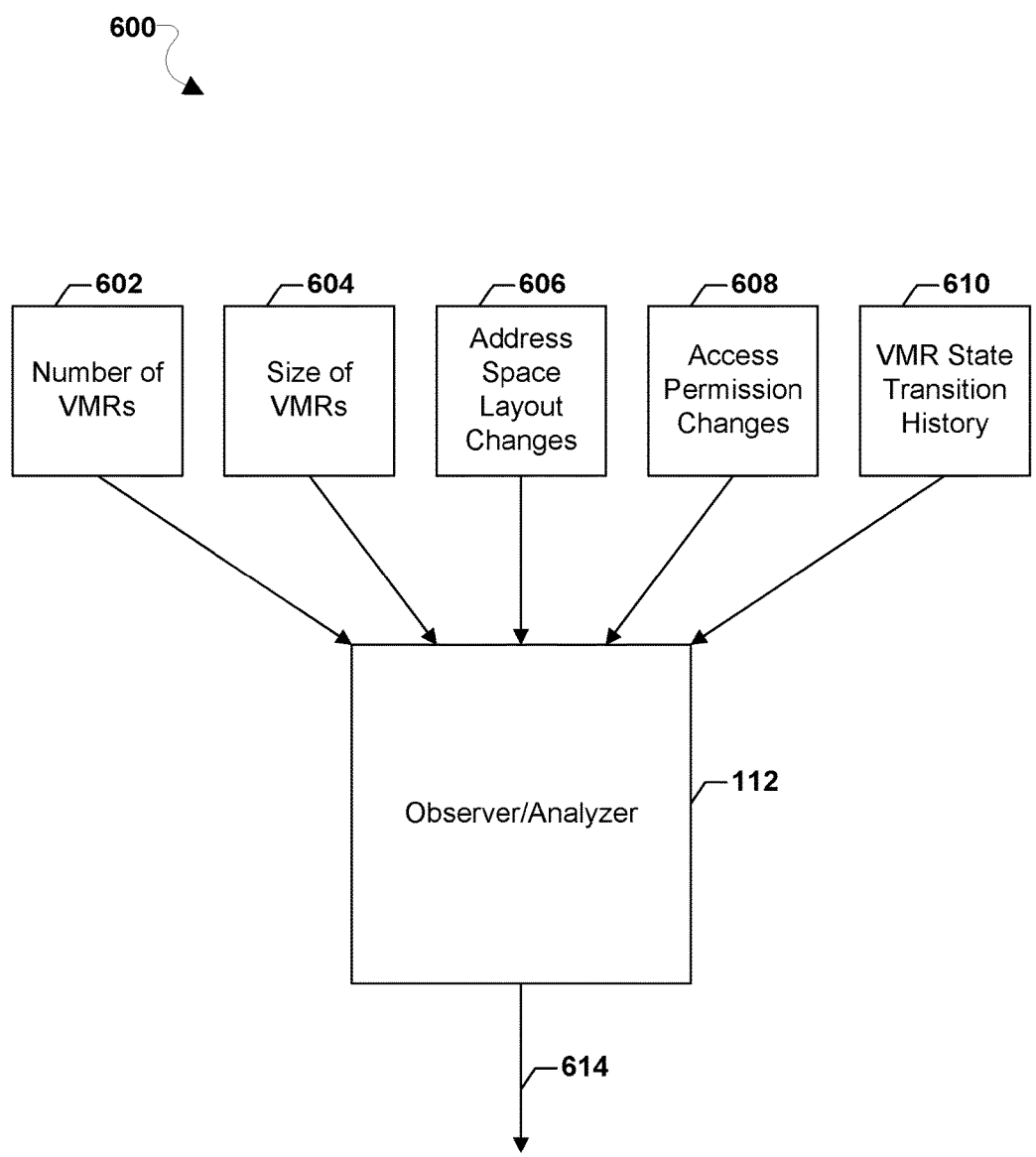
FIG. 6 is a block diagram of a virtual memory region monitoring system in a computing device in accordance with various embodiments.

FIG. 6 illustrates a block diagram for an example implementation of a VMR monitoring system 600 in a computing device. The VMR monitoring system 600 may include the observer/analyzer unit 112 that takes as input monitored structural attributes 602 through 610 of a number of VMRs utilized by a process and compares the monitored structural attributes to expected structural attributes of the VMRs for the process. The comparison and analysis may be based on a set of rules, or may be accomplished through machine learning by modeling the expected structural attributes of the VMRs and address space of the process. If the monitored structural attributes do not match the expected structural attributes, the observer/analyzer unit 112 may send an output 614 to other components in the computing device. The output 614 may include instructions to take a protective action, such as terminating the process, locking certain parts of the operating system from the process, initiating anti-malware programs, or other actions.

A process may have an associated address space that includes a number of VMRs. These VMRs may include portions of the stack, heap, libraries, and main text of the process. For example, each VMR may correspond to a function, a variable, a pointer, or other discrete segments of data or instructions stored in the process address space.

Structural attributes of VMRs may include attributes that define or describe the structure, allocation, geography, or state transition history of the VMRs over time. Structural attributes may be data independent. In other words, the actual data or content stored within the VMR may not be included as a structural attribute, and changes in structural attributes of a VMR may not depend on changes in the data stored in the VMR. The monitored structural attributes 602 through 610 are non-limiting examples of various structural attributes that may be monitored by the observer/analyzer unit 112.

One monitored structural attribute 602 may be the number of VMRs that exist in the address space. A process may normally utilize a certain number of VMRs during normal execution. Control-hijacking attacks may involve allocating new sections of memory to store foreign or injected code or data. Thus, changes in the number of VMRs may indicate anomalous behavior caused by control-hijacking software attacks. The number of VMRs may be monitored through a kernel mapper, which calls a function (e.g. do_mmap( )) whenever a new VMR is created.

Another monitored structural attribute 604 may be the size of each VMR. For example, memory allocated to certain variables used by a process may be the same across multiple executions, so a change in the size of a VMR may indicate anomalous behavior caused by control-hijacking software attacks (e.g. an attack that artificially creates a buffer overflow). The size of VMRs may be monitored through the kernel mapper, calls to malloc( ) function, and the addition of new functions in the library of the process address space.

Another monitored structural attribute 606 may be address space layout changes for the process. A process may normally arrange its address space with a specific internal structure so that VMRs are located in the same locations relative to each other, and the layout does not change across multiple executions. Thus, changes to the layout of the address space may indicate anomalous behavior caused by control-hijacking software attacks. The address space layout changes of a process may be monitored through the kernel mapper.

Another monitored structural attribute 608 may be access permission changes for VMRs. Each VMR may be assigned access permissions by the process that generally do not change across multiple executions. Thus, changes to the access permissions of VMRs may indicate anomalous behavior caused by control-hijacking software attacks. The access permission changes of VMRs may be monitored through the kernel virtual memory manager, which may be called whenever there is a change to a permission of a VMR.

Another monitored structural attribute 610 may be the VMR state transition history of a process over time. The process may navigate through various VMRs in a predictable order that does not change across multiple executions. Thus when a process engages in a series of state transitions between VMRs that is not expected, it may be indicative of anomalous behavior caused by control-hijacking software attacks. The VMR state transition history may be monitored through hardware or software based solutions, which are described in further detail with reference to FIGS. 7, 9, and 10.

Figure 7:
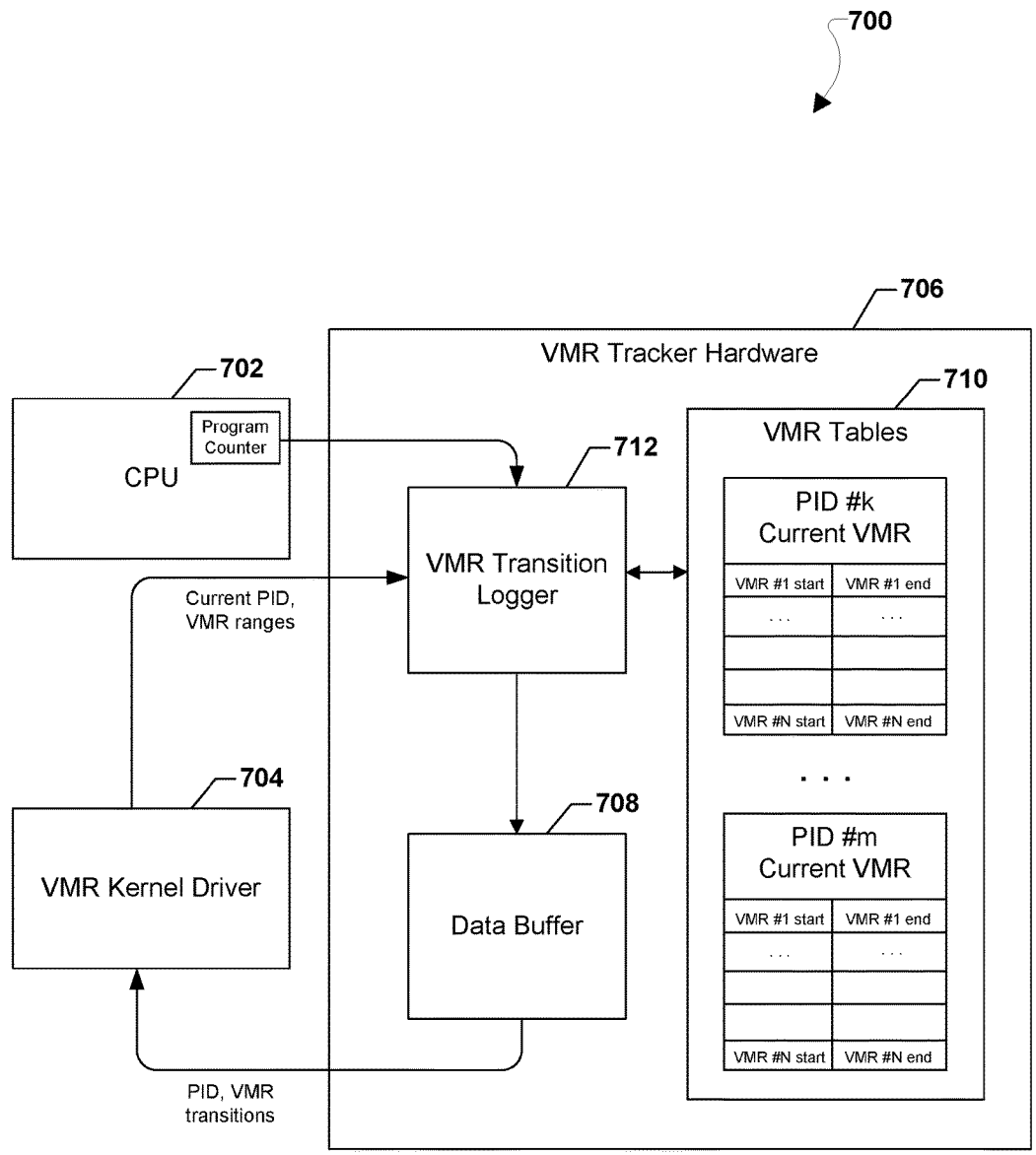
FIG. 7 is a component block diagram of a virtual memory region transition tracker in accordance with various embodiments.

FIG. 7 illustrates a hardware implementation for monitoring VMR transitions of a process executing on a computing device. System 700 includes a CPU core 702 that executes the process and maintains a program counter for the process. The system 700 may also include a VMR kernel driver 704 that maintains the memory ranges of VMRs of various processes executing on the computing device. The system 700 may also include a VMR tracker hardware block 706. The VMR tracker hardware block 706 may include a VMR transition logger 712 that receives as input the program counter from the CPU core 702, as well as the current process ID (PID) and the VMR ranges from the VMR kernel driver 704. The VMR tracker hardware block 706 may store a number of VMR tables 710, which may include a table for each process executing on the computing device, indexed by the PID. Each table may store the VMRs allocated by that process and the last known VMR in which the process is executing.

Periodically, the VMR transition logger 712 may receive the VMR ranges, PID and/or program counter as inputs. These inputs identify a process to be monitored and the current instruction pointed to by the program counter. The VMR transition logger 712 may compare the input information to the VMR tables 710 to determine whether the monitored process is still in the same VMR or has transitioned to a different VMR (e.g. a function call from the main text of a process to a library function). If there has been a VMR transition, the VMR transition logger 712 may log the VMR transition and store it in a data buffer 708. The VMR transition and the PID may also be sent to the VMR kernel driver 704 as well. In this manner, the VMR tracker hardware block 706 may detect and monitor VMR transitions in processes executing on the computing device.

While the VMR tracker hardware block 706 is a hardware implementation for monitoring VMR state transition history, VMR state transition history may alternatively be monitored through software. Constant software monitoring of VMR state transitions may be resource intensive and may impact the operation of other processes on the computing device. However, there are several ways to monitor VMR state transitions in a non-continuous fashion, which may be implemented individually or in combination.

For example, in selective tracking VMR state transition, monitoring may be initiated only for certain executing processes that are of interest. Other executing processes may not be monitored. The tracking software may monitor the program counters of the processes that are of interest. In periodic tracking, the tracking software may periodically sample a process' program counter according to a timer thread. In a multi CPU core system, the timer thread may be tied to a CPU on which the process is not running. The period of the timer thread may be tunable so that the periodicity may be adapted to the specific process behavior and the chance of missing VMR state transitions is reduced.

In opportunistic tracking, the VMR kernel driver may receive control of the CPU on which the process is executing. On those occasions, the VMR kernel driver may sample the program counter and track VMR state transitions. For example, the VMR kernel driver may receive processor control during interrupt arrivals, context switches, signal generation, and system calls. In page fault based tracking, the tracking software may set the non-current VMRs as non-executable (e.g. read-only) and each time the process jumps to a new VMR there will be a page fault. The tracking software may log the state transition whenever it detects a page fault, set the new VMR to executable, and set the old VMR as non-executable.

Figure 8:
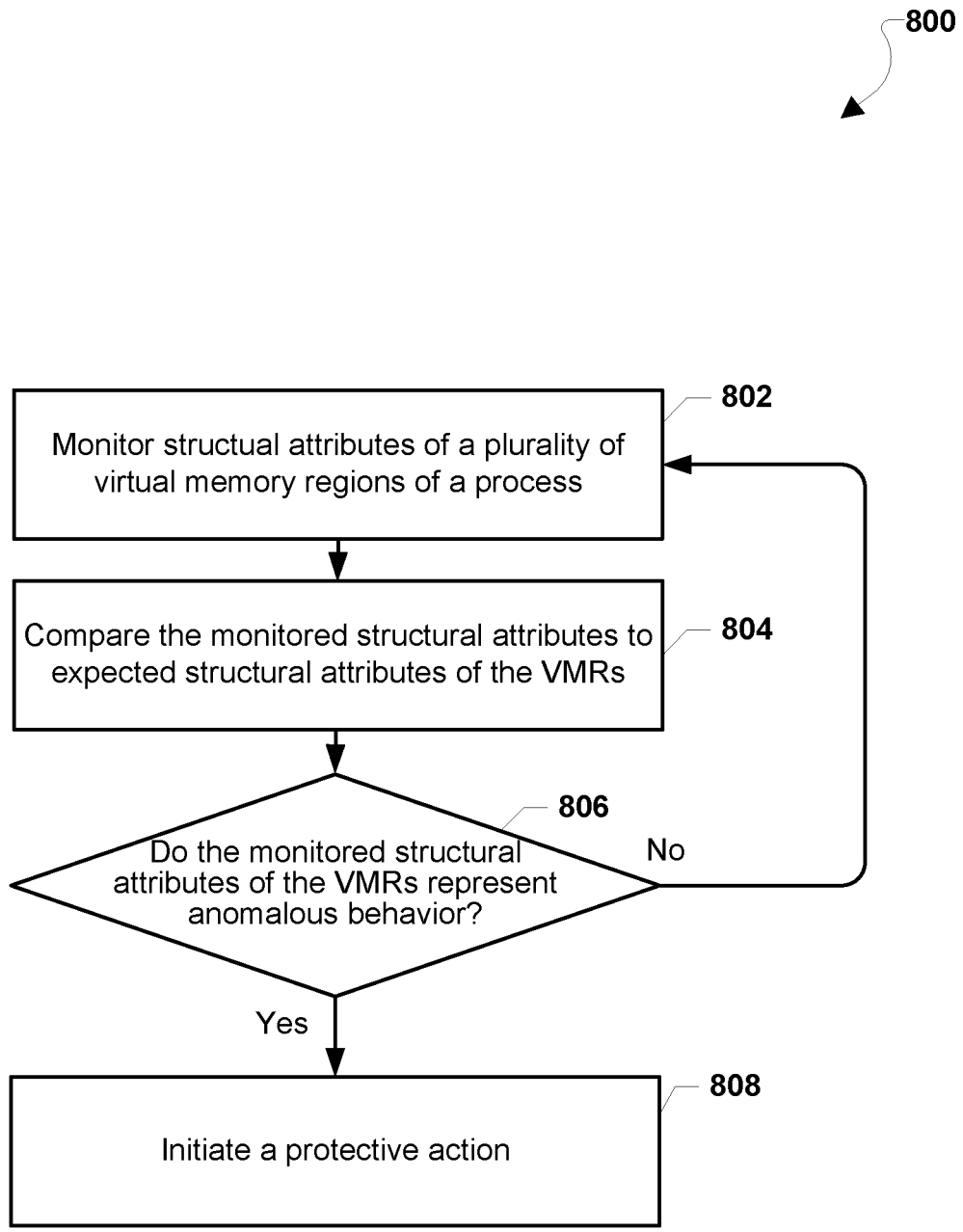
FIG. 8 is a process flow diagram illustrating methods for detecting software attacks on a process executing on a computing device in accordance with various embodiments.

FIG. 8 illustrates a method 800 for detecting software attacks on a process executing on a computing device in accordance with various embodiments. The method 800 may be implemented by a processor of a computing device (e.g. the CPU 102 of the computing device 100 in FIG. 1A).

In block 802, the processor may monitor structural attributes of a plurality of virtual memory regions of a process executing on the computing device. The process may have an associated address space that may be divided into a number of VMRs. The VMRs may be contiguous portions of memory that store data, instructions, or functions that may be found in the stack, heap, libraries, main text, or other portions of the address space for the process. The monitored structural attributes may include the number of VMRs utilized by the process, the size of each VMR, address space layout changes of the VMRs, access permission changes of the VMRs, and VMR state transition history.

In block 804, the processor may compare the monitored structural attributes of the plurality of VMRs to expected structural attributes of the plurality of VMRs of the process. The computing device may have previously analyzed the expected behavior of the process (i.e. executing without interference from control-hijacking attacks) in allocating, utilizing, and transitioning between VMRs, and has constructed a model or set of rules that define the expected structural attributes of the VMRs for the process. The processor may utilize mathematical models, rule-based comparisons, or other methods to compare the monitored structural attributes to the expected structural attributes.

In determination block 806, the processor may determine whether the monitored structural attributes of the plurality of VMRs for the process represent anomalous behavior based on the comparison between the monitored structural attributes and the expected structural attributes. For example, the processor may use mathematical models to generate a value representing the similarity between the monitored structural attributes and the expected structural attributes, and compare the value to a threshold that represents an acceptable degree of similarity. If the value is below the threshold, the monitored structural attributes may represent anomalous behavior. In another example, the processor may apply a set of rules to the monitored structural attributes and determine whether the monitored structural attributes satisfy all of the rules. If the monitored structural attributes do not satisfy one or more rules, the monitored structural attributes may represent anomalous behavior.

In response to determining that the monitored structural attributes do not represent anomalous behavior (determination block 806="No"), the processor may continue to monitor the structural attributes of the plurality of VMRs as long as the process is executing (i.e. return to the operation in block 802). In response to determining that the monitored structural attributes represent anomalous behavior (determination block 806="Yes"), the processor may initiate a protective action in block 808. For example, the processor may terminate the process, lock certain parts of the operating system from the process, initiate anti-malware programs, or other actions. In this manner, the method 800 provides a way to monitor for control-hijacking software attacks on processes by monitoring structural attributes of the VMRs in the process' address space.

Figure 9:
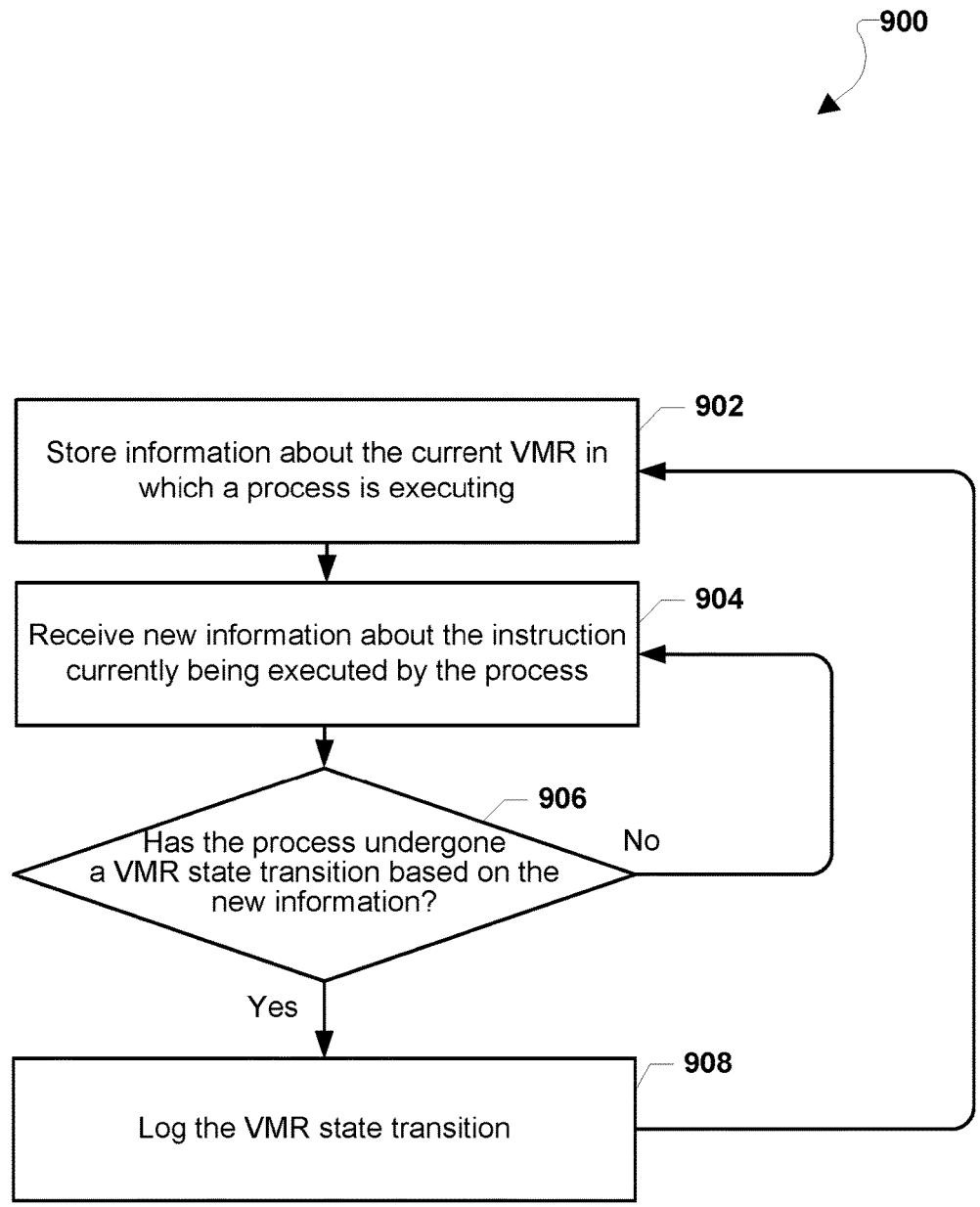
FIG. 9 is a process flow diagram illustrating hardware-based methods for tracking virtual memory region transitions of a process executing on a computing device in accordance with various embodiments.

FIG. 9 illustrates a method 900 for hardware-based tracking of VMR state transition history for a process executing on a computing device in accordance with various embodiments. The method 900 may be implemented by a processor of a computing device (e.g. the CPU 102 of the computing device 100 in FIG. 1A) or by a processor in VMR tracker hardware in the computing device (e.g. the VMR tracker hardware block 706 in FIG. 7).

In block 902, the processor may store information about the current VMR in which a process on the computing device is executing. The process may utilize an address space that includes a number of VMRs representing contiguous portions of memory storing data, functions, or instructions. A program counter for the process may point to the current VMR in which the process is executing. The information stored may include the PID of the processor, the memory ranges of all of the VMRs in the process' address space, and the current VMR in which the process is executing (e.g. a function in the main text of a process). For example, this information may be stored in table form, one for each process that the processor is monitoring. The information may be stored in a data store in the VMR tracker hardware.

In block 904, the processor may receive new information about the instruction currently being executed by the process. For example, the processor may occasionally receive an updated program counter from the CPU on which the process is executing. The processor may also receive the PID and current memory ranges of the VMRs of the process from a VMR kernel driver.

In determination block 906, the processor may determine whether the process has undergone a VMR state transition based on the new information. The processor may utilize the program counter, PID, and current memory ranges of the VMRs to determine whether the process has transitioned to another VMR. For example, if the last stored current VMR for the process is in the main text of the process, the processor may determine from the program counter whether the process is still executing within the same VMR, or has transitioned to another VMR (e.g. a function call to a function stored in a library).

In response to determining that the process has not undergone a VMR state transition (determination block 906="No"), the processor may continue to receive new information about the instruction currently being executed by the process in block 904. In response to determining that the process has undergone a VMR state transition (determination block 906="Yes"), the processor may log the VMR state transition in block 908. For example, the processor may store the VMR that the process transitioned from and the VMR to which the processor transitioned. The processor may then store the new current VMR information in block 902. In this manner, the method 900 provides a hardware-based implementation for tracking VMR state transition history of a process.

Figure 10:
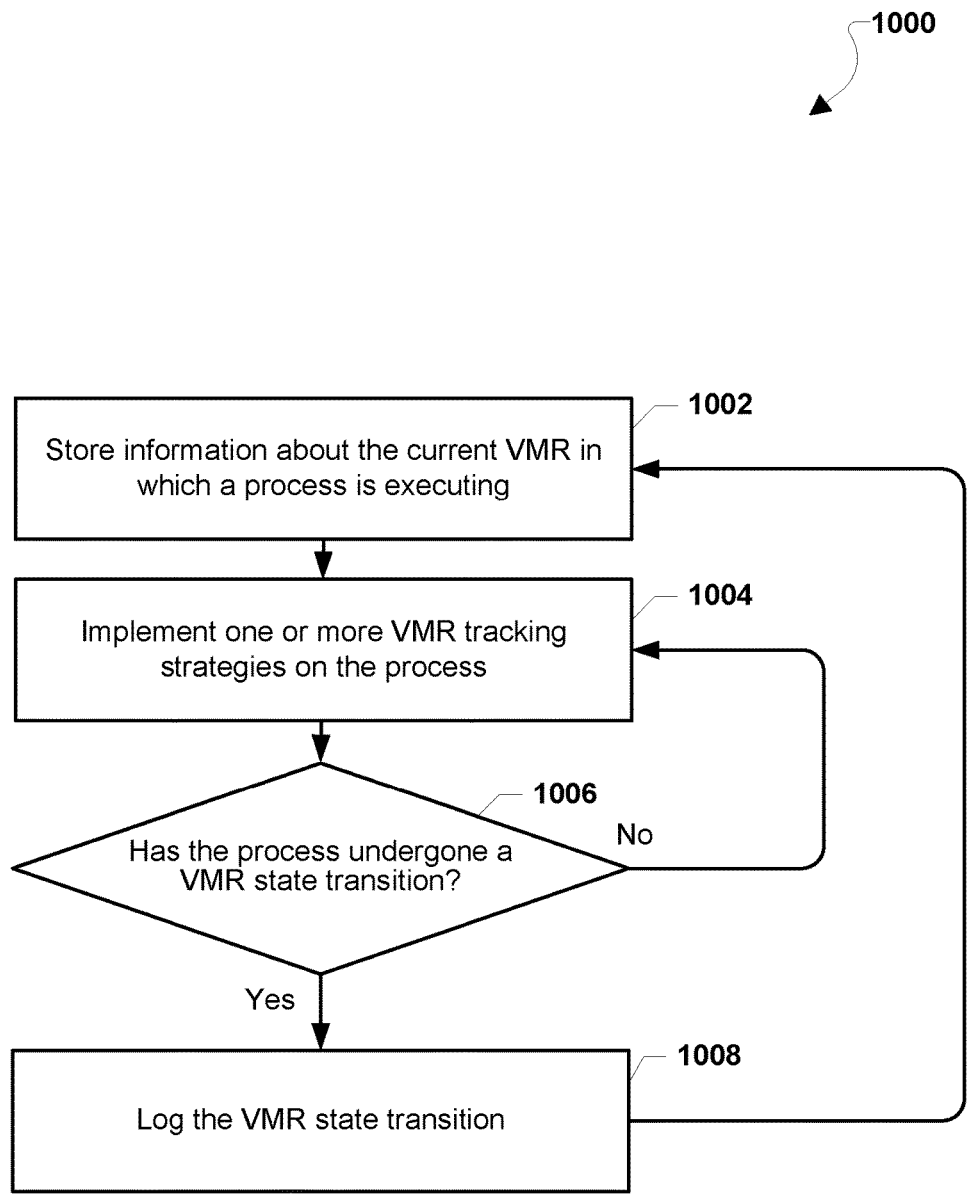
FIG. 10 is a process flow diagram illustrating software-based methods for tracking virtual memory region transitions of a process executing on a computing device in accordance with various embodiments.

FIG. 10 illustrates a method 1000 for software-based tracking of VMR state transition history for a process executing on a computing device in accordance with various embodiments. The method 1000 may be implemented by a processor of a computing device (e.g. the CPU 102 of the computing device 100 in FIG. 1A).

In block 1002, the processor may store information about the current VMR in which a process on the computing device is executing. The process may utilize an address space that includes a number of VMRs representing contiguous portions of memory storing data, functions, or instructions. A program counter for the process may point to the current VMR in which the process is executing. The information stored may include the PID of the processor, the memory ranges of all of the VMRs in the process' address space, and the current VMR in which the process is executing (e.g. a function in the main text of a process). For example, this information may be stored in table form, one for each process that the processor is monitoring.

In block 1004, the processor may implement one or more VMR tracking strategies on the process. Examples of VMR tracking strategies may include: selective tracking (tracking only certain processes of interest); periodic tracking (collecting VMR state transition information on a periodic basis); opportunistic tracking (collecting VMR state transition information when a VMR kernel driver gains control of the processor upon which the process is executing); and page fault based tracking (setting all non-current VMRs as non-executable and tracking the page faults when VMR state transitions occur).

In determination block 1006, the processor may determine whether the process has undergone a VMR state transition. The processor may determine from the one or more VMR transition tracking strategies whether a VMR state transition has occurred. For example, VMR state transitions may be detected when a program counter of the process points to a new VMR, or whether there has been a page fault in page fault based tracking.

In response to determining that the process has not undergone a VMR state transition (determination block 1006="No"), the processor may continue to implement one or more VMR tracking strategies on the process in block 1004. In response to determining that the process has undergone a VMR state transition (determination block 1006="Yes"), the processor may log the VMR state transition in block 1008. For example, the processor may store the VMR that the process transitioned from and the VMR to which the processor transitioned. The processor may then store the new current VMR information in block 1002. In this manner, the method 1000 provides a software-based implementation for tracking VMR state transition history of a process.

Figure 11:
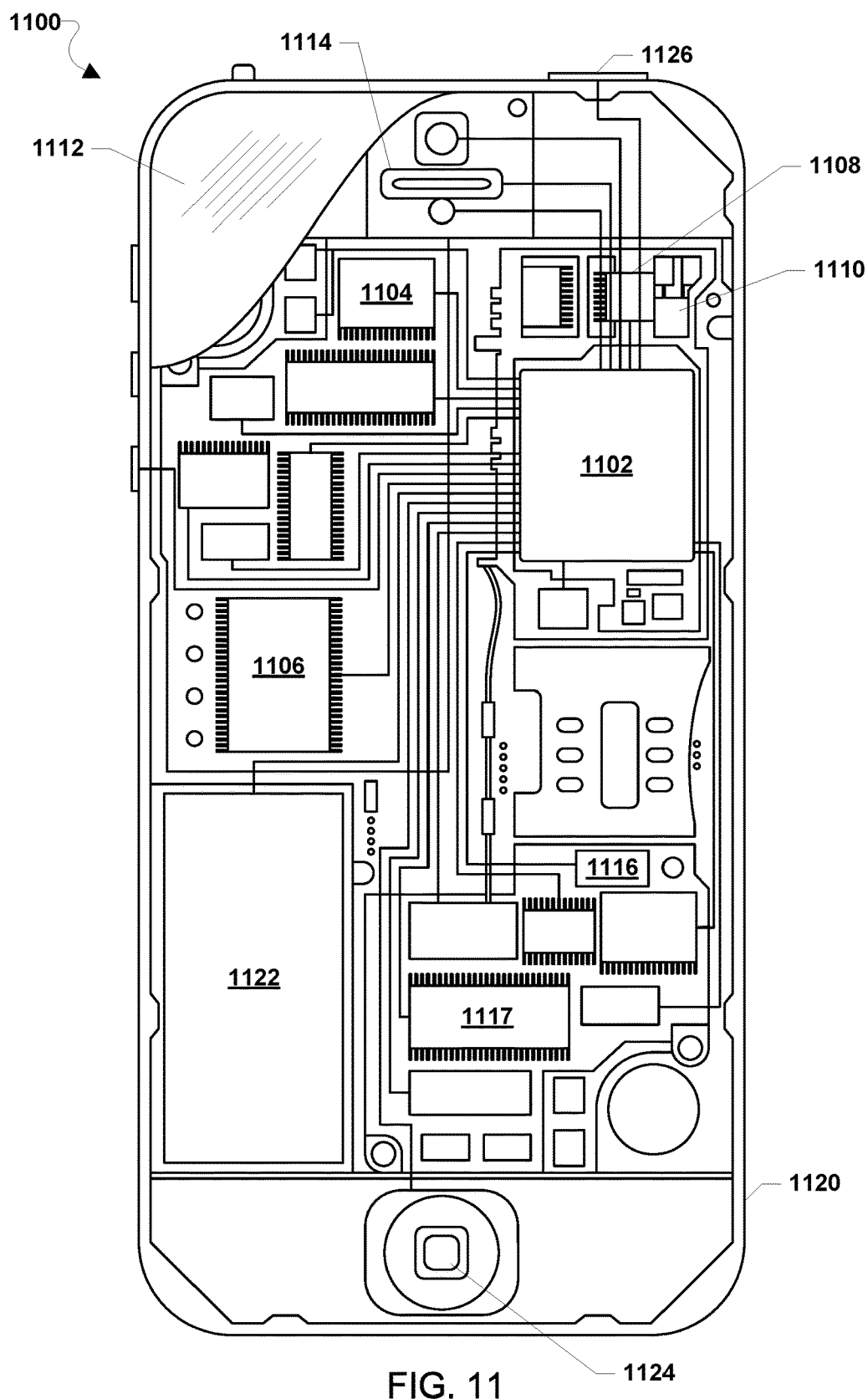
FIG. 11 is a component block diagram of a mobile communication device suitable for implementing some embodiment methods.

Various embodiments may be implemented in any of a variety of computing devices, an example of which (e.g., communication device 1100) is illustrated in FIG. 11. In various implementations, the communication device 1100 may be similar to the computing device 100 as described herein with reference to FIG. 1A. As such, the communication device 1100 may implement some or all of the methods 800, 900, and 1000 in FIGS. 8-10.

A communication device 1100 may include a processor 1102 coupled to a touchscreen controller 1104 and an internal memory 1106. The processor 1102 may be one or more multi-core integrated circuits designated for general or specific processing tasks. The internal memory 1106 may be volatile or non-volatile memory, and may also be secure and/or encrypted memory, or unsecure and/or unencrypted memory, or any combination thereof. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the communication device 1100 need not have touch screen capability.

A communication device 1100 may have a cellular network transceiver 1108 coupled to the processor 1102 and to an antenna 1110 and configured for sending and receiving cellular communications. The transceiver 1108 and the antenna 1110 may be used with the herein-mentioned circuitry to implement various embodiment methods. The communication device 1100 may include one or more SIM cards 1116 coupled to the transceiver 1108 and/or the processor 1102 and may be configured as described herein. The communication device 1100 may include a cellular network wireless modem chip 1117 that enables communication via a cellular network and may be coupled to the processor.

A communication device 1100 may also include speakers 1114 for providing audio outputs. The communication device 1100 may also include a housing 1120, constructed of a plastic, metal, or a combination of materials, for containing all or some of the components discussed herein. The communication device 1100 may include a power source 1122 coupled to the processor 1102, such as a disposable or rechargeable battery. The rechargeable battery may also be coupled to the peripheral device connection port to receive a charging current from a source external to the communication device 1100. The communication device 1100 may also include a physical button 1124 for receiving user inputs. The communication device 1100 may also include a power button 1126 for turning the communication device 1100 on and off.

The foregoing method descriptions and the process flow diagrams are provided merely as illustrative examples and are not intended to require or imply that the operations of various embodiments and implementations must be performed in the order presented. As will be appreciated by one of skill in the art the order of operations in the foregoing embodiments and implementations may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, units, circuits, and algorithm operations described in connection with the embodiments and implementations disclosed herein may be implemented as electronic hardware, computer software, or combinations of both. To clearly illustrate this interchangeability of hardware and software, various illustrative components, blocks, units, circuits, and operations have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, units, and circuits described in connection with the embodiments and implementations disclosed herein may be implemented in or performed by a variety of processors or combinations of processors and circuits. Examples of processors and circuits that may implement the various embodiments include general purpose processors, digital signal processors (DSP), application specific integrated circuits (ASIC), field programmable gate arrays (FPGA), and other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more example embodiments and implementations, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software unit that may reside on a non-transitory computer-readable or processor-readable storage medium. Non-transitory computer-readable or processor-readable storage media may be any storage media that may be used to store desired program code in the form of instructions or data structures and that may be accessed by a computer or a processor. By way of example but not limitation, such non-transitory computer-readable or processor-readable storage media may include RAM, ROM, EEPROM, FLASH memory, CD-ROM or other optical disk storage, and magnetic disk storage or other magnetic storage devices. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the memory described herein are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of various embodiments and implementations is provided to enable any person skilled in the art to make or use the claims. Various modifications to these embodiments will be readily apparent to those skilled in the art, and the generic principles defined herein may be applied to some embodiments without departing from the scope of the claims. Thus, the present disclosure is not intended to be limited to the embodiments and implementations shown herein but is to be accorded the widest scope consistent with the following claims and the principles and novel features disclosed herein.

What is claimed is:

1. A method for detecting software attacks on a process executing on a computing device, comprising:
monitoring, via a processor in the computing device, structural attributes of a plurality of virtual memory regions utilized by the process, wherein the monitored structural attributes include how many virtual memory regions are utilized by the process;

generating a vector data-structure that includes a series of numbers, wherein each number signifies a partial or complete representation of data collected via the monitoring;

comparing, via the processor, the monitored structural attributes to expected structural attributes of the plurality of virtual memory regions by applying the generated vector data-structure to a classifier model; and determining, via the processor, whether the monitored structural attributes represent anomalous behavior of the process based on a result of applying the generated vector data- structure to the classifier model.

2. The method of claim 1, further comprising:
initiating a protective action in response to determining that the monitored structural attributes represent anomalous behavior.

3. The method of claim 1, wherein monitoring the structural attributes of the plurality of virtual memory regions utilized by the process further comprises:
monitoring changes to access permissions of the plurality of virtual memory regions; or
monitoring a state transition history of the plurality of virtual memory regions.

4. The method of claim 1, wherein monitoring the structural attributes of the plurality of virtual memory regions utilized by the process comprises:
storing information about a current virtual memory region in which the process is executing;
receiving new information about an instruction currently being executed by the process;
determining whether there has been a transition from the current virtual memory region based on the received new information; and
logging the transition from the current virtual memory region to a new virtual memory region in response to determining that there has been the transition from the current virtual memory region.

5. The method of claim 4, wherein receiving the new information about the instruction currently being executed by the process comprises receiving a program counter value and a process identifier.

6. The method of claim 1, wherein monitoring the structural attributes of the plurality of virtual memory regions utilized by the process comprises:
storing information about a current virtual memory region in which the process is executing;
implementing one or more virtual memory region tracking strategies on the plurality of virtual memory regions;
determining whether there has been a transition from the current virtual memory region based on the one or more virtual memory region tracking strategies; and
logging the transition from the current virtual memory region to a new virtual memory region in response to determining that there has been the transition from the current virtual memory region.

7. The method of claim 6, wherein implementing the one or more virtual memory region tracking strategies on the plurality of virtual memory regions comprises implementing selective tracking, periodic tracking, opportunistic tracking, or page fault based tracking on the plurality of virtual memory regions.

8. The method of claim 1, wherein comparing the monitored structural attributes to the expected structural attributes of the plurality of virtual memory regions comprises applying a set of rules to the monitored structural attributes, wherein the set of rules are based on the expected structural attributes of the plurality of virtual memory regions.

9. The method of claim 1, wherein comparing the monitored structural attributes to the expected structural attributes of the plurality of virtual memory regions comprises:
modeling the expected structural attributes of the plurality of virtual memory regions to generate a model; and
comparing the monitored structural attributes to the model.

10. A computing device, comprising:
a memory comprising a plurality of virtual memory regions; and
a processor coupled to the memory and configured with processor-executable instructions to:
monitor structural attributes of the plurality of virtual memory regions utilized by a process executing on the computing device, wherein the monitored structural attributes include how many virtual memory regions are utilized by the process;
generating a vector data-structure that includes a series of numbers, wherein each number signifies a partial or complete representation of data collected via the monitoring;
compare the monitored structural attributes to expected structural attributes of the plurality of virtual memory regions by applying the generated vector data-structure to a classifier model; and
determine whether the monitored structural attributes represent anomalous behavior of the process based on a result of applying the generated vector data-structure to the classifier model.

11. The computing device of claim 10, wherein the processor is further configured with processor-executable instructions to:
initiate a protective action in response to determining that the monitored structural attributes represent anomalous behavior.

12. The computing device of claim 10, wherein the processor is further configured with processor-executable instructions such that monitoring the structural attributes of the plurality of virtual memory regions utilized by the process is performed by:
monitoring changes to access permissions of the plurality of virtual memory regions; or
monitoring a state transition history of the plurality of virtual memory regions.

13. The computing device of claim 10, wherein the processor is further configured with processor-executable instructions to monitor the structural attributes of the plurality of virtual memory regions utilized by the process by:
storing information about a current virtual memory region in which the process is executing;
receiving new information about an instruction currently being executed by the process;
determining whether there has been a transition from the current virtual memory region based on the received new information; and
logging the transition from the current virtual memory region to a new virtual memory region in response to determining that there has been the transition from the current virtual memory region.

14. The computing device of claim 13, wherein the processor is configured with processor-executable instructions to perform operations such that receiving the new information about the instruction currently being executed by the process comprises receiving a program counter value and a process identifier.

15. The computing device of claim 10, wherein the processor is further configured with processor-executable instructions to perform operations such that monitoring the structural attributes of the plurality of virtual memory regions utilized by the process comprises:
   storing information about a current virtual memory region in which the process is executing;
   implementing one or more virtual memory region tracking strategies on the plurality of virtual memory regions;
   determining whether there has been a transition from the current virtual memory region based on the one or more virtual memory region tracking strategies; and
   logging the transition from the current virtual memory region to a new virtual memory region in response to determining that there has been the transition from the current virtual memory region.

16. The computing device of claim 15, wherein the processor is configured with processor-executable instructions to perform operations such that implementing the one or more virtual memory region tracking strategies on the plurality of virtual memory regions comprises implementing selective tracking, periodic tracking, opportunistic tracking, or page fault based tracking on the plurality of virtual memory regions.

17. The computing device of claim 10, wherein the processor is further configured with processor-executable instructions such that comparing the monitored structural attributes to the expected structural attributes of the plurality of virtual memory regions comprises:
   applying a set of rules to the monitored structural attributes, wherein the set of rules are based on the expected structural attributes of the plurality of virtual memory regions.

18. The computing device of claim 10, wherein the processor is further configured with processor-executable instructions such that comparing the monitored structural attributes to the expected structural attributes of the plurality of virtual memory regions comprises:
   modeling the expected structural attributes of the plurality of virtual memory regions to generate a model; and
   comparing the monitored structural attributes to the model.

19. A non-transitory computer readable storage medium having stored thereon processor-executable software instructions configured to cause a processor of a computing device to perform operations comprising:
   monitoring structural attributes of a plurality of virtual memory regions utilized by a process executing on the computing device, wherein the monitored structural attributes include how many virtual memory regions are utilized by the process;
   generating a vector data-structure that includes a series of numbers, wherein each number signifies a partial or complete representation of data collected via the monitoring;
   comparing the monitored structural attributes to expected structural attributes of the plurality of virtual memory regions by applying the generated vector data-structure to a classifier model; and
   determining whether the monitored structural attributes represent anomalous behavior of the process based on a result of applying the generated vector data-structure to the classifier model.

20. The non-transitory computer readable storage medium of claim 19, wherein the stored processor-executable software instructions are configured to cause the processor to perform operations further comprising:
   initiating a protective action in response to determining that the monitored structural attributes represent anomalous behavior.

21. The non-transitory computer readable storage medium of claim 19, wherein the stored processor-executable software instructions are configured to cause the processor to perform operations such that monitoring the structural attributes of the plurality of virtual memory regions utilized by the process further comprises:
   monitoring changes to access permissions of the plurality of virtual memory regions; or
   monitoring a state transition history of the plurality of virtual memory regions.

22. The non-transitory computer readable storage medium of claim 19, wherein the stored processor-executable software instructions are configured to cause the processor to perform operations such that monitoring the structural attributes of the plurality of virtual memory regions utilized by the process comprises:
   storing information about a current virtual memory region in which the process is executing;
   receiving new information about an instruction currently being executed by the process;
   determining whether there has been a transition from the current virtual memory region based on the received new information; and
   logging the transition from the current virtual memory region to a new virtual memory region in response to determining that there has been the transition from the current virtual memory region.

23. The non-transitory computer readable storage medium of claim 22, wherein the stored processor-executable software instructions are configured to cause the processor to perform operations such that receiving the new information about the instruction currently being executed by the process comprises receiving a program counter value and a process identifier.

24. The non-transitory computer readable storage medium of claim 19, wherein the stored processor-executable software instructions are configured to cause the processor to perform operations such that monitoring the structural attributes of the plurality of virtual memory regions utilized by the process comprises:
   storing information about a current virtual memory region in which the process is executing;
   implementing one or more virtual memory region tracking strategies on the plurality of virtual memory regions;
   determining whether there has been a transition from the current virtual memory region based on the one or more virtual memory region tracking strategies; and
   logging the transition from the current virtual memory region to a new virtual memory region in response to determining that there has been the transition from the current virtual memory region.

25. The non-transitory computer readable storage medium of claim 24, wherein the stored processor-executable software instructions are configured to cause the processor to perform operations such that implementing the one or more virtual memory region tracking strategies on the plurality of virtual memory regions comprises implementing selective tracking, periodic tracking, opportunistic tracking, or page fault based tracking on the plurality of virtual memory regions.

26. The non-transitory computer readable storage medium of claim 19, wherein the stored processor-executable software instructions are configured to cause the processor to perform operations such that comparing the monitored structural attributes to the expected structural attributes of the plurality of virtual memory regions comprises:
  applying a set of rules to the monitored structural attributes, wherein the set of rules are based on the expected structural attributes of the plurality of virtual memory regions.

27. The non-transitory computer readable storage medium of claim 19, wherein the stored processor-executable software instructions are configured to cause the processor to perform operations such that comparing the monitored structural attributes to the expected structural attributes of the plurality of virtual memory regions comprises:
  modeling the expected structural attributes of the plurality of virtual memory regions to generate a model; and
  comparing the monitored structural attributes to the model.

28. A computing device, comprising:
  means for monitoring structural attributes of a plurality of virtual memory regions utilized by a process executing on the computing device, wherein the monitored structural attributes include how many virtual memory regions are utilized by the process;
  means for generating a vector data-structure that includes a series of numbers, wherein each number signifies a partial or complete representation of data collected via the monitoring;
  means for comparing the monitored structural attributes to expected structural attributes of the plurality of virtual memory regions comprising means for applying the generated vector data-structure to a classifier model; and
  means for determining whether the monitored structural attributes represent anomalous behavior of the process based on a result of applying the generated vector data-structure to the classifier model.

* * * * *